United States Patent [19]
Reinicke et al.

[11] Patent Number: 6,141,497
[45] Date of Patent: *Oct. 31, 2000

[54] MULTILAYER MICRO-GAS RHEOSTAT WITH ELECTRICAL-HEATER CONTROL OF GAS FLOW

[75] Inventors: Robert H. Reinicke, Mission Viejo, Calif.; Stephen D. Bruneau, Edgewater Park, N.J.

[73] Assignee: Marotta Scientific Controls, Inc., Montville, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/870,816

[22] Filed: Jun. 6, 1997

Related U.S. Application Data

[63] Continuation-in-part of application No. 08/659,965, Jun. 7, 1996.
[60] Provisional application No. 60/000,107, Jun. 9, 1995.

[51] Int. Cl.$^7$ .................. B64G 1/26; F24H 3/00
[52] U.S. Cl. .................. 392/485; 137/341; 219/201; 251/11; 244/164
[58] Field of Search .................. 392/485, 490, 392/494, 466, 465, 479, 484; 73/23.35, 23.36, 23.42, 863.12, 863.11, 863.01, 204.25, 204.26; 96/101–107; 137/341; 422/89; 244/164, 171–172, 169; 60/203.1; 251/11, 129.01, 368; 219/543

[56] References Cited

U.S. PATENT DOCUMENTS

| | | | |
|---|---|---|---|
| 2,837,623 | 6/1958 | Judson et al. | 392/466 |
| 3,279,177 | 10/1966 | Ducati | 60/203.1 |
| 4,322,946 | 4/1982 | Murch et al. | 60/203.1 |

(List continued on next page.)

FOREIGN PATENT DOCUMENTS

| | | | |
|---|---|---|---|
| 0142866 | 5/1985 | European Pat. Off. | A61M 5/14 |
| 0824022 | 8/1996 | European Pat. Off. | A61M 5/168 |
| 936330 | 12/1955 | Germany | 392/485 |
| 62-108156 | 5/1987 | Japan. | |
| 299036 | 3/1971 | U.S.S.R. | 392/485 |
| 1241867 | 8/1971 | United Kingdom. | |
| 94/28318 | 12/1994 | WIPO. | |
| WO94/28318 | 12/1994 | WIPO. | |
| WO95/09988 | 4/1995 | WIPO. | |

OTHER PUBLICATIONS

Kurt E. Petersen, Silicon as a Mechanical Material, Proceedings of the IEEE, May 1, 1982, pp. 420–457, vol. 70 No. 5.

James B. Angell, Stephen C. Terry & Phillip W. Barth, Silicon Micromechanical Devices, Scientific American, Apr. 1983, pp. 36–47, US.

Supplementary European Search Report, EPO application number EP 97 92 9874.2, Apr. 28, 1999.

Douglas H. Morash and Leon Strand, "Miniature Propulsion Components for the Pluto Fast Flyby Spacecraft," AIAA Paper 94–3374, presented at the AIAA Joint Propulsion Conference, Jun. 27–29, 1994, 11 pages.

PCT International Preliminary Examination Report (PCT Article 36 and Rule 70), International Application No. PCT/US97/09962, Date of completion of this report Aug. 11, 1998, 4 pages.

PCT Written Opinion (PCT Rule 66), International Application No. PCT/US97/09962, Date of Mailing Jun. 24, 1998, 5 pages.

PCT International Search Report, International Application No. PCT/US97/09962, Date of Mailing Oct. 7, 1997, 7 pages.

*Primary Examiner*—John A. Jeffery
*Assistant Examiner*—Daniel L. Robinson
*Attorney, Agent, or Firm*—Hopgood, Calimafde, Kalil & Judlowe, LLP

[57] ABSTRACT

A device and method for controlling small flows of gas, such as would be used by a satellite (or microsatellite) for orientation thrusters includes a photoetched silicon body etched to provide one or more particular flow paths, and optionally filters, where the flow path is defined by the silicon body and a sealing glass layer bonded thereto. Flow is controlled through the flow path(s) by heating the body to decrease the gas flow.

47 Claims, 11 Drawing Sheets

U.S. PATENT DOCUMENTS

| | | | |
|---|---|---|---|
| 4,474,889 | 10/1984 | Terry et al. | 422/89 |
| 4,604,090 | 8/1986 | Reinicke | 604/118 |
| 4,626,244 | 12/1986 | Reinicke | 604/141 |
| 4,656,828 | 4/1987 | Bingley et al. | 60/203.1 |
| 4,715,852 | 12/1987 | Reinicke . | |
| 4,935,040 | 6/1990 | Goedert | 73/23.22 |
| 5,027,596 | 7/1991 | Steenborg | 60/203.1 |
| 5,069,419 | 12/1991 | Jerman | 251/129.01 |
| 5,267,584 | 12/1993 | Smith | 60/203.1 |
| 5,278,940 | 1/1994 | Muller | 392/485 |
| 5,323,999 | 6/1994 | Bonne et al. | 251/11 |
| 5,544,276 | 8/1996 | Loux et al. | 392/480 |
| 5,681,024 | 10/1997 | Lisec et al. | 251/11 |

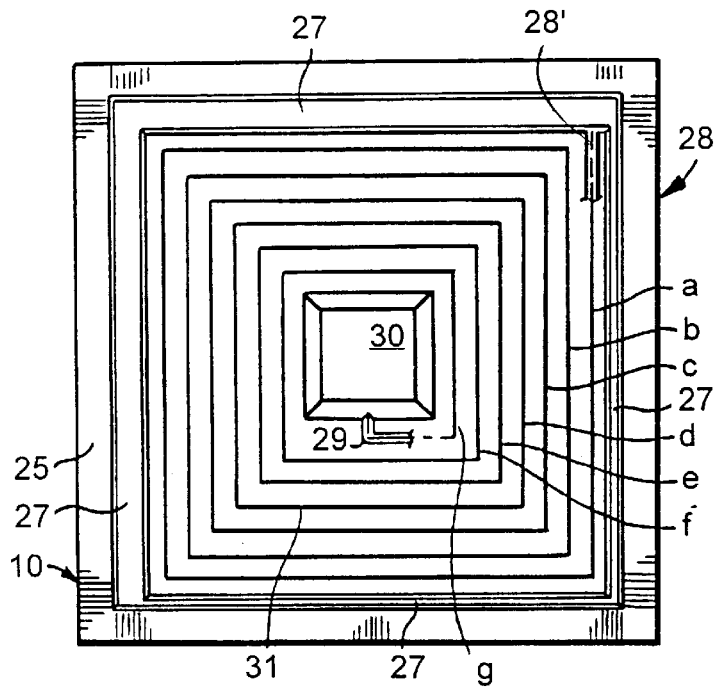
FIG. 3
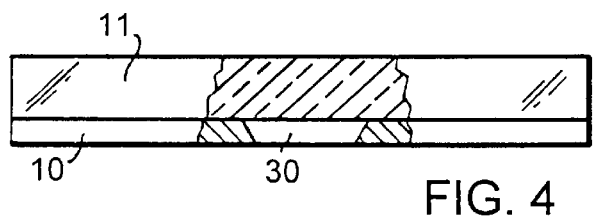
FIG. 4
FIG. 5
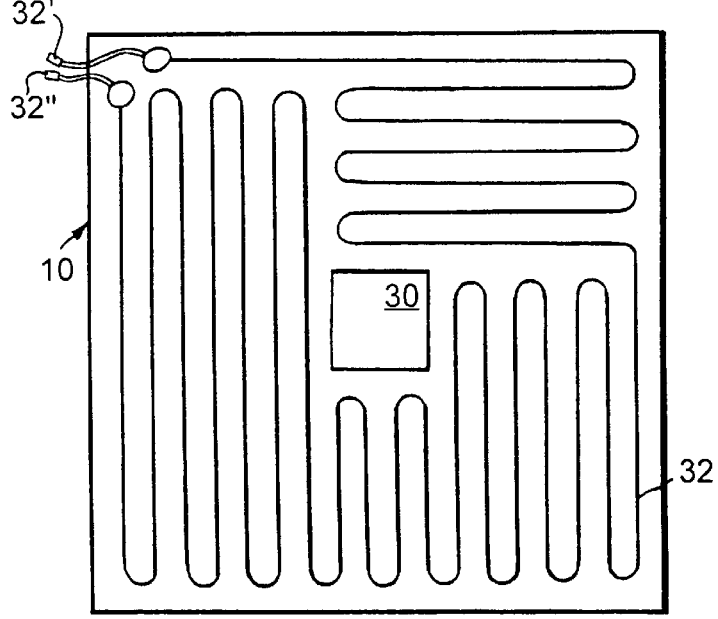

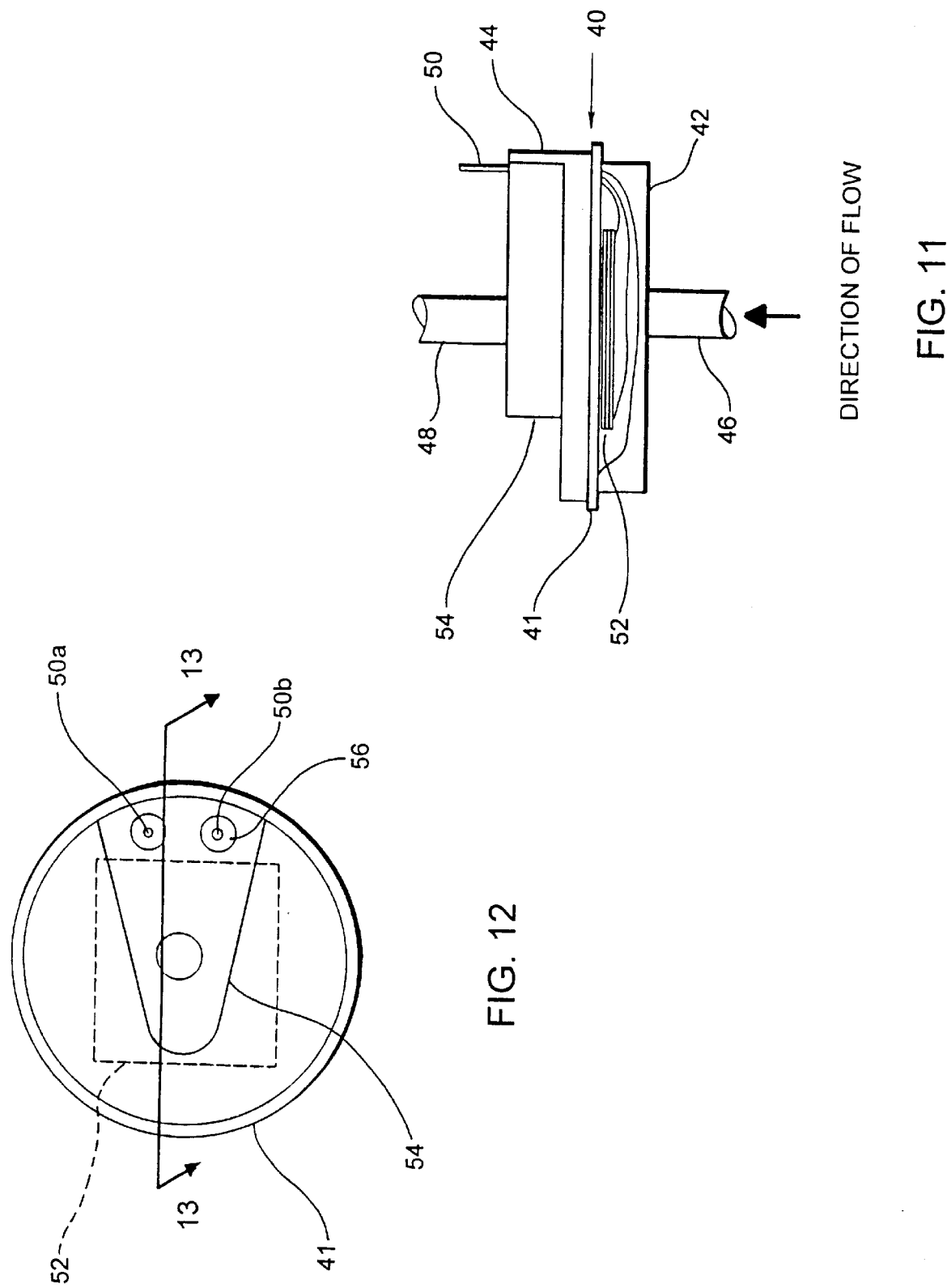

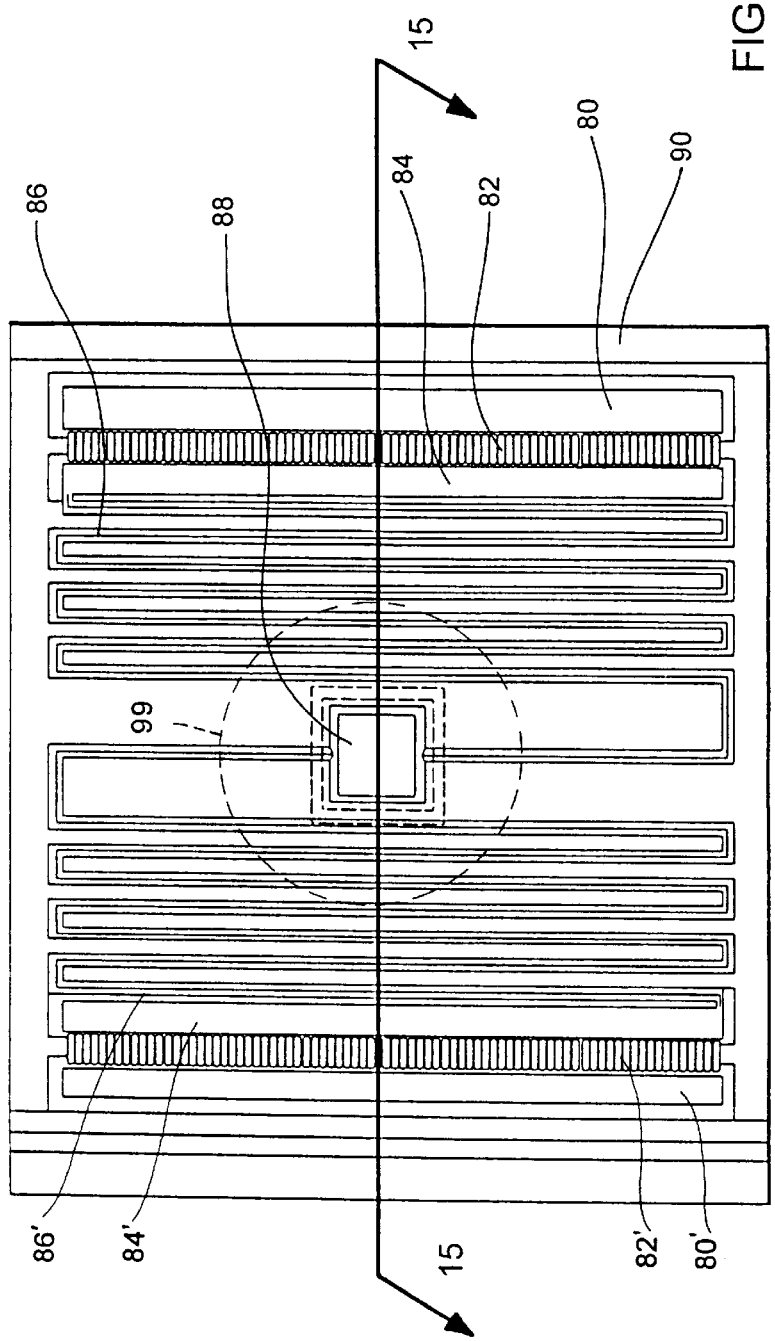
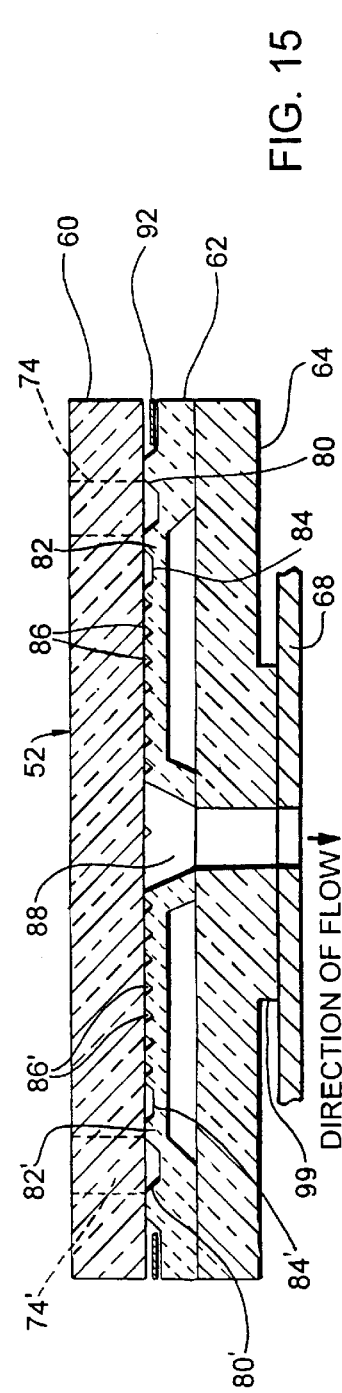
FIG. 14
FIG. 15

MULTILAYER MICRO-GAS RHEOSTAT WITH ELECTRICAL-HEATER CONTROL OF GAS FLOW

This Application is based on provisional Application No. 60/000,107, filed Jun. 9, 1995, the disclosure of which is incorporated herein by reference in its entirety. This application is also a continuation-in-part of copending Application Ser. No. 08/659,965, filed Jun. 7, 1996.

BACKGROUND OF THE INVENTION

1. Field of the Invention

The invention relates to a variable control device for use in regulating or throttling of relatively low flows of fluid, the device being a solid state device capable of electronically regulating relatively low flows throughout a moderate flow regime. The disclosures of a second application, entitled "Microvalve and Microthruster for Satellites and Methods of Making and Using the Same" and of related subject matter, Application Ser. No. 08/659,965, and also filed Jun. 7, 1996, and the provisional Application No. 60/000,106 on which it is based, filed Jun. 9, 1995, are both incorporated herein by reference.

2. The State of the Art

More specifically, it is known to use pressurized gas, such as Xenon, in small increments of flow to a thruster, using a so-called "thermothrottle" (a device of Russian origin) for each of a plurality of thrusters, wherein an elongate tube establishes a path for the requisite gas flow, and an electrical heater winding developed around and along the length of the tube is the means of controlling gas temperature and viscosity, and therefore flow rate, between inlet and outlet ends of the tube. But this is a cumbersome and expensive technique, involving problems of production reproducibility, and the dynamic range of flow control has its limitations. See, e.g., K. N. Kozubsky et al., "Plan and Status of the Development and Qualification Program for the Stationary Plasma Thruster", *AIAA/SAE/ASME/ASEE 29th Joint Propulsion Conf. and Exhibit,* Jun. 28–30, 1993, Monterey, Calif. (AIAA-93-1787) (the disclosure of which is incorporated herein by reference).

It is known from U.S. Pat. Nos. 4,604,090 and 4,715,852 to provide a miniature device for automated metering of insulin to certain diabetic patients. The device is surgically implanted in the body and establishes an elongate capillary path for controlled small flows of insulin within the body. The device is a consolidated prismatic assembly of laminations, of microchip proportions, wherein a flat silicon chip has a photo-etched surface characterized by an elongate single capillary groove, which may have a length of 10 to 15 inches, helically developed on approximately a half-inch square of a flat surface, between inlet and outlet ends, with a glass plate bonded to the grooved surface to complete the integrity of a single flow passage in the groove. The ambient environmental temperature is, of course, body heat, and there is no need for or suggestion of heat as a flow-control parameter. Furthermore, the fluid is a liquid and in the environment of these patents the device and/or the patient is intolerable of the presence of a gas in the liquid.

SUMMARY AND OBJECTS OF THE INVENTION

It is a principal object of the invention to achieve a precision construction, on a scale of microchip proportions, for electrical control of gas temperature and/or viscosity, and preferably thus gas flow, for such small flows as will enable years of orientation-thruster use of the character indicated. In preferred embodiments, the device provides a turndown of about 3:1 and has an average mass-flow rate of about 5 mg/sec of gas, preferably Xenon; for example, a mass throughput ranging controllably from about 2 to about 6 mg/second.

According to a first aspect, the invention provides what may be termed as a micro gas rheostat for electrical-heater control of gas flow, comprising a consolidated body of flat laminations, wherein a first lamination has a grooved surface establishing a single elongate path between inlet and outlet ends of the path. A second lamination has a flat surface bonded to the grooved surface of the first lamination, thereby closing the groove along its length to complete the exclusivity of communicating gas flow between the inlet and outlet ends. The first lamination has a second flat surface in spaced parallel relation to the first surface, and an electrical-resistance heater element is bonded to, deposited on, or otherwise in heat-transfer relation with the second surface of the first lamination. Alternatively, the electrical-resistance heater element is formed along a wall surface of the groove.

Elongate length of the groove is the product of a helical development between a central port and an outer port at the respective ends of the groove, and the inlet and outlet ends of the passage may be reversibly associated with the respective central and outer ports. Preferably, the helical development is a progression of square-leg sections, on a body of square or rectangular planform.

Preferably also, the inlet and/or outlet ports or both of them are associated with a so-called comb-filter array of groove formations in the grooved surface of the first lamination, the comb-filter grooves being of individual section area smaller than the section area of the flow-passage groove, but of collective section area exceeding the section area of the flow-passage groove, so that heater control of flow may be essentially limited to the helically developed flow passage.

As with the implanted insulin-metering device, the first lamination is suitably a silicon chip, which is preferably of so-called single-crystal silicon, so that in utilizing photo-etching techniques to form the grooves, the grooves will be of V-section, in that etching will track the crystal-face orientation and will terminate at a depth at which the sides of the V intersect; thus, etched-groove width determines groove depth, and the narrower grooves for filter-comb formations will necessarily be of lesser depth (and section) than the wider grooves of the flow-controlled helical passage. The fabrication of micromechanical devices relies upon techniques which the present invention employs; and these techniques have existed and been improved upon for more than the last decade. See, e.g., James B. Angell et al., "Silicon Micromechanical Devices", *Sci. Am.,* April 1983, p. 42–56; and Kurt E. Petersen, "Silicon as a Mechanical Material", *Proc. IEEE,* vol. 70, no. 5, 400–457 (May 1982) (the disclosures of which are both incorporated herein by reference). In addition to silicon, the invention can employ any single-crystal material that can be processed as silicon can be processed in accordance with this invention, and which has sufficient mechanical and structural integrity to function in the environment in which the invention is desired to be used. Such materials can include, for example, gallium arsenide, various silicate, borosilicate, aluminosilicate, and related glasses, and various nitrides, such as boron nitride and silicon nitride.

The second flat lamination is suitably of borosilicate glass having substantially the same thermal coefficient of expansion as that of the single-crystal silicon of the first flat lamination. This relation of expansion coefficients makes possible the consolidation of these laminations in an "anodic bonding" process as described in the literature; for example, George Wallis, "Field Assisted Glass Sealing", *Electrocomponent Science and Technology*, vol. 2, no. 1, pp. 45–53 (1975) and "Field Assisted Glass-Metal Sealing", infra, (the disclosures of which are incorporated herein by reference).

Suitably, inlet and outlet port connections to the respective ends of the grooved passage, via one or more comb-filter arrays, are made via the thickness of either one of the bonded laminations; alternatively, the comb-filter formations and inlet/outlet connection thereto may be external to the device and may be external to the bonded laminations but nevertheless communicating with one or both of the respective ends of the helical groove path.

Silicon wafers are commercially available for today's micro-electronic purposes and are well-adapted to the kind of photoetching procedures outlined above in the Angell and Petersen articles (incorporated hereinabove by reference). Thus, a standard wafer of 3-inch diameter and 0.015-inch thickness can serve for the simultaneous photo-etched reproduction of an array of 37 duplicate silicon-lamination area elements (0.375×0.375 inches square). Known techniques, such as diamond saws and laser beams, are available for cutting individual etched elements away from each other, it being preferred that the glass lamination shall have been bonded to the etched array prior to severing into individual but identical assemblies. And it is observed that for certain applications there is merit in retaining an integrally assembled plurality of the elements as a compact, unsevered, multiple-element array.

In another aspect of the invention, the rheostat is a multilayer body that is structurally isolated from the housing but attached thereto by having been bonded to a metal foil disposed securely within the housing. The securement of the chip to a foil layer acts to isolate the body from mechanical and/or thermal stresses induced in the housing, from being transferred to the chip; such stresses can degrade the functioning of the chip and may be great enough to crack, distort, or break the chip. Etched onto a surface of the body is a series of connected flow channels, preferably including a series of filters, and also preferably having a serpentine or extended configuration along the surface in order to allow heating of the body to reduce the mass flow through the channels. The body is heated by passing a current directly therethrough, such that the body itself becomes a resistance heater.

In another aspect, this invention provides a solid-state device for throttling mass flow in a moderate flow range, such as a turndown ratio of about 3:1.

BRIEF DESCRIPTION OF THE DRAWINGS

The invention will be described in detail for preferred and other embodiments, in conjunction with the accompanying drawings, in which:

FIG. 3 is a greatly enlarged plan view of a groove surface of a lamination in the device of FIG. 1;

FIG. 4 is a side view of the device of FIG. 1, to the scale of FIG. 3, and partly broken-away and in section at a mid-section plane;

FIG. 5 is a schematic bottom-end view representation of a heater element, forming part of the device of FIG. 1 and to the scale of FIG. 3;

FIG. 11 is an idealized side-elevation view of a micro-gas rheostat device according to the invention, wherein part of its housing is broken-away to schematically reveal a rheostat body contained within the housing;

FIG. 12 is a top-end view of the device of FIG. 11;

FIG. 14 is an idealized bottom-end view of the flow-control layer of the microrheostat body of FIG. 11;

FIG. 15 is a cross-section taken along line 15—15 of FIG. 14 showing a modified microrheostat body having a circular boss for connection to the foil layer;

DETAILED DESCRIPTION

Figure 2:
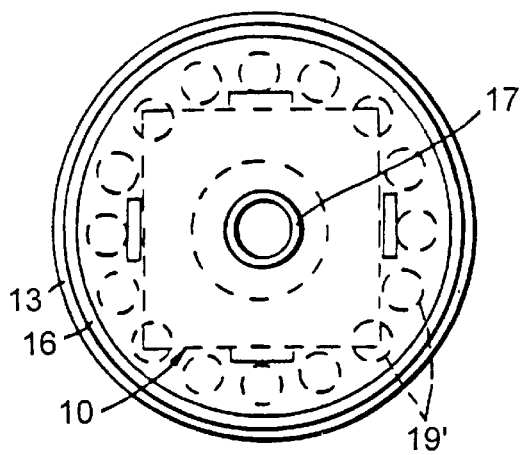
FIG. 2 is a top-end view of the device of FIG. 1.
Figure 1:
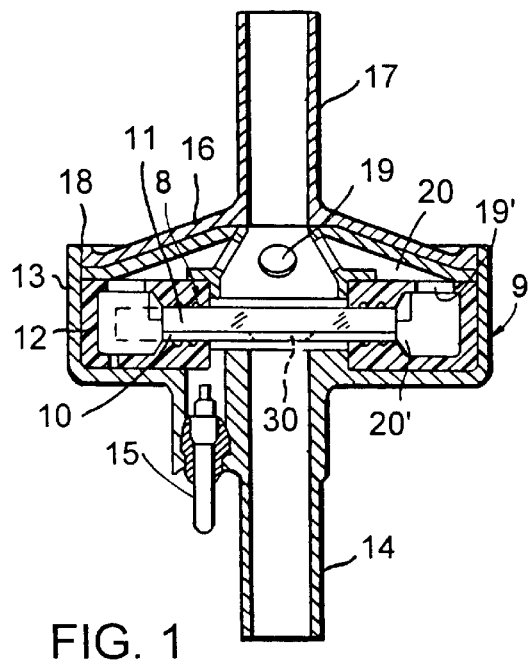
FIG. 1 is an enlarged view in vertical section for a complete micro-gas rheostat device of the invention.

In FIG. 1, the basic laminated structure of one embodiment of a micro-gas rheostat of the invention is seen to comprise a bonded body 8 of first and second laminations 10, 11, respectively, of elemental square, rectangular, octagonal, or other preferably regular polygonal planform, depicted as square in FIG. 3. The micro-gas rheostat further comprises a housing 9 having a cupped housing member 13 and housing-closure member 16. The consolidated body 8 is cushioned and sealed by an elastomeric seal member 12 in its containment within cupped housing member 13 having a reduced tubular end 14 for downstream discharge of a controlled gas flow through the micro-gas rheostat. An electrically insulated pin connector formation 15 alongside the discharge end 14 enables detachable electrical connection to a source of electrical energy. A radially flanged upper housing-closure member 16 has a reduced tubular end 17 for connection to a pressurized source of gas flow to be controlled by body 8 pursuant to electrical input at 15 and within housing 13, 16, which is shown to be permanently sealed at a circumferential weld 18.

A conical element, with plural spaced apertures 19, distributes inlet gas to a circumferential first manifold 20, and plural spaced apertures 19' in seal member 12 distribute inlet gas into a second manifold 20' which is in full circumferential communication with circumferentially continuous exposure to the open (inlet) ends of the plural groove passages of inlet-filter structure 28, a so-called comb filter.

Figure 7:
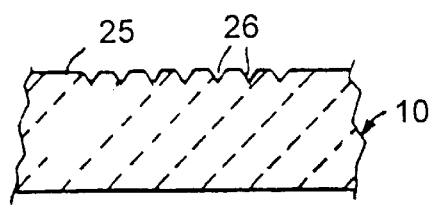
FIG. 7 is another fragmentary sectional side-elevation view illustrative of other grooves in FIG. 3 and to the scale of FIG. 6.
Figure 8:
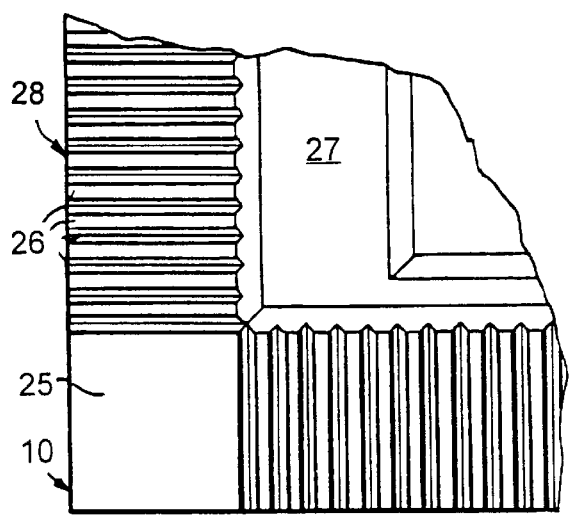
FIG. 8 is a greatly enlarged fragmentary detail, in plan view of a corner of the grooved plan of FIG. 3.

Directing attention now to FIGS. 3 to 8, the consolidated body 8 is seen to comprise a first flat lamination 10, which is preferably of single-crystal silicon and which is shown in FIG. 3 with its grooved surface facing up, to reveal the four walls 25 of the comb filter 28. As seen in FIGS. 7 and 8, the comb filter 28 consists of plural spaced parallel relatively narrow grooves 26 in each of the four walls 25; these grooves are closed by the glass lamination 11, so that each of the grooves 26 makes its gas-flow contribution in parallel with all other grooves 26, from the manifold 20' of FIG. 1, and into a further manifolding groove or trough formation 27 within the peripheral walls 25. At 28', the manifolding groove 27 has access to the inlet end of a helical groove formation, consisting of plural turns of interconnected leg segments of progressively diminishing length, with termination at an inner end 29 for downstream discharge at a central outlet 30 which is seen in FIG. 1 to be served by the outlet tube 14 of the housing member 13. For the sake of clarity in FIG. 3, it will be understood that individual groove widths are not drawn for the entire helical length of the single elongate flow passage that they define; rather, a single line 31, with progressively shrinking helical courses a, b, c, d, e, f, g, serves to indicate the full helical path, and in FIG. 6, the V-cut width, depth and spacing of representative adjacent helical courses b, c, d are shown to the same scale, for comparison in FIG. 7 with the narrower comb-filter grooves 26, having the lesser width and lesser depth (and therefore, lesser cross-sectional area).

Figure 1A:
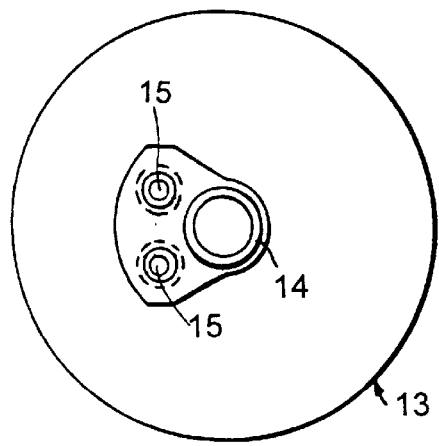
FIG. 1A is a bottom-end view of the device of FIG. 1.
Figure 6:
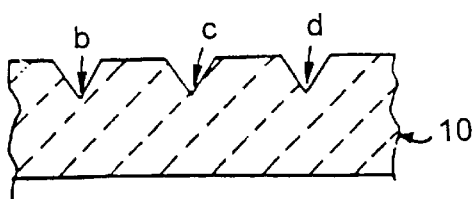
FIG. 6 is a greatly enlarged fragmentary sectional side-elevation view illustrative of one of the grooves in FIG. 3.

Finally, in FIG. 5, an illustrative heater layout of electrical-resistance material 32 is shown in application to the flat other surface of the silicon lamination 10. This heater layout effectively covers the entire lower surface of lamination 10, with lead wires 32, 32' to the external pin-connector means 15 of FIGS. 1 and 1A. The metal layer 32 is preferably gold or aluminum that has been sputtered or electroplated onto the surface in the serpentine pattern shown, which is a pattern typical for resistance heating. It should be appreciated that there are two pins 15, 15' (as seen in FIG. 1A), providing positive and negative connections to the power source for the heater 32.

Figure 9:
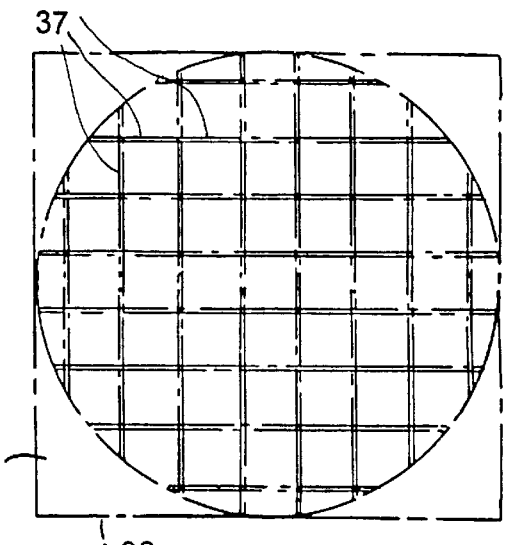
FIG. 9 is a view of a conventional circular silicon wafer, suitable for multiple photo-etched reproduction of the grooved plan of FIG. 3.

FIG. 9 illustrates the typical layout for multiple-element reproduction of plural micro-gas rheostats on and from the same single circular wafer 35, which may be of conventional 3-inch diameter and 0.015-inch thickness. In FIG. 9, the double-line definition of 37 complete duplicate square configurations will be understood to suggest allowance for diamond saw or other cutting of individual square elements (e.g., 0.375 inch by 0.375 inch) from the entire wafer. The glass lamination is shown to be a 3.0×3.0 inch square panel which will be understood to have been bonded to all grooved surfaces throughout the wafer 35, prior to severance into single elements or multiple-element arrays.

Figure 10:
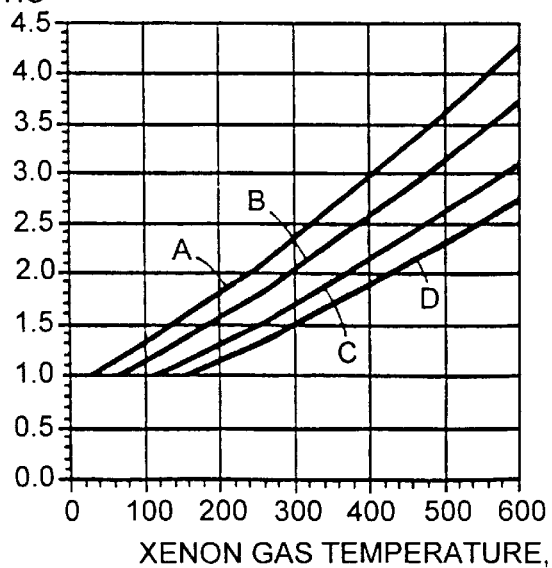
FIG. 10 is a graphical display of mass-flow rate turn-down ratio as a function of Xenon-gas temperature, for several illustrative starting or reference temperature situations commencing at unity turn-down ratio for each of these situations and covering the range to 600° F.

In use, gas flow from inlet 17 to outlet 14 of the described rheostat device of FIG. 1 is illustrated in FIG. 10 to follow the relationship in the laminar-flow regime of:

$$\ddot{m}=K(P_1^2-P_2^2)/(T \cdot U),$$

where: $\ddot{m}$ is the mass-flow rate of the gas in $lb_m$/sec.; K is a constant; $P_1$ and $P_2$ are the respective absolute inlet and outlet pressures of the rheostat device in psia; T is absolute temperature (° R.); and U is the absolute viscosity of the gas ($lb_m$/ft·degree·sec).

Electrical energy to the heater pin connector 15 may be continuous at various selected voltage levels, but it is presently preferred that electrical energy be supplied on a pulse-width modulation basis, so that a dwell period exists between successive input pulses. The dwell period may be repeatedly used for monitoring (via suitable microchip pressure and temperature transducers) the instantaneous pressure levels $P_1$ and $P_2$, as well as gas temperature, thereby to establish current mass-flow of the rheostat-controlled gas flow. For example, during the dwell time, the resistance of the heater 32 or of the silicon can be measured with a local sensor, and since resistance is proportional to temperature, knowledge of the temperature of the chip 8 implies the possible mass-flow rate at the time of temperature sensing, resistance-temperature devices (RTDs) are commercially available for a variety of applications.

In FIG. 10, the flow-rate turn-down ratio is set forth, commencing a unity turn-down ratio, for each of several starting or reference temperatures, namely, curve A starting at 32° F., curve B starting at 68° F., curve C starting at 120° F., and curve D starting at 160° F.

Of the displayed samples in FIG. 10, a dynamic flow-rate range of more than 4:1 is seen to be controllable over the 32 to 600° F. range of curve A, and this range decreases for the successively greater starting temperatures for curves B, C, and D, so that for a 160° F. starting temperature, curve D shows only a 2.75:1 range of flow-rate controllability.

Another embodiment of the invention is shown in FIGS. 11–14, to which reference is now made. FIG. 11 is an idealized side view of a rheostat device housing 40 having an inlet housing portion 42 and an outlet housing portion 44 providing fluid communication between an inlet tube 46 and a discharge tube 48 associated with each of the housing portions. Integral with the discharge housing portion 44 is an electrical connection 50, the placement of which is a matter more of design choice, since its function is to provide electrical connection to the multilayer body 52, as described above in connection with FIGS. 1 and 1A. The electrical connection 50 is supported in an electrical connection formation 54 integral with the discharge housing portion 44.

As seen in FIG. 12, the multilayer body 52 shown in phantom is supported in the rheostat device housing 40 which is preferably formed with a housing flange 41 of generally circular shape to facilitate placement of the device housing in tubing and other circular frames and flowpaths. As described above, the electrical connection requires two inputs, shown as 50A and 50B, which are secured in the housing 40 and electrically insulated therefrom by an insulating bush 56. The insulating bush 56 is preferably a borosilicate glass that has been fused in place at high temperature effective to maintain the resulting glass in compression; such processing is commercially available from Northeast Electronics Corp., Milford, Conn.

Figure 13:
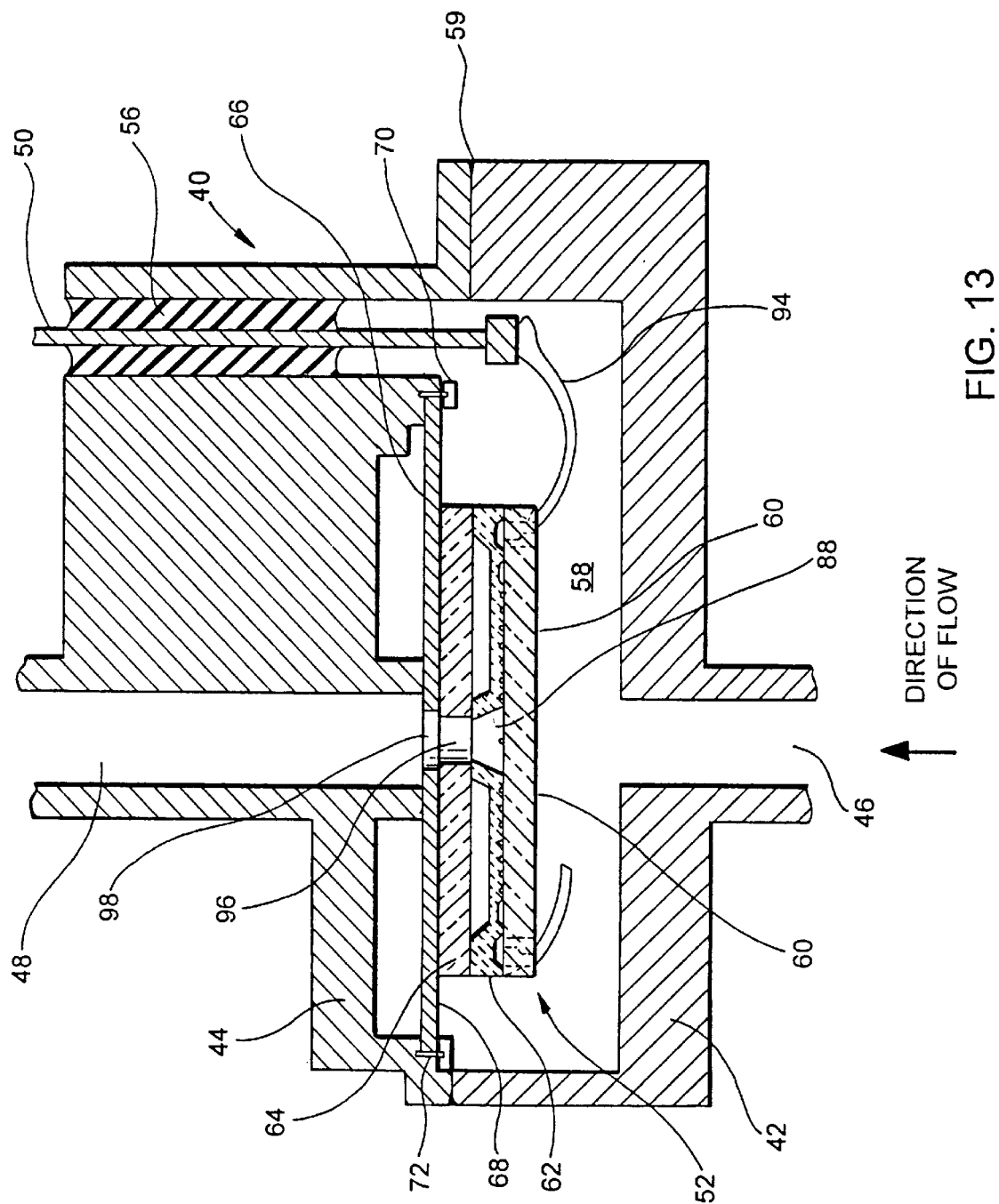
FIG. 13 is a cross-section, taken at 13—13 in FIG. 12, and on an enlarged scale for greater detail.

Line 13—13 of FIG. 12 provides the cross-sectional basis for the enlarged view of FIG. 13, in which the inlet housing portion 42 provides an inlet housing manifold 58 from the inlet tube 46. The housing portions 42, 44 are attached at a peripheral weld 59, thus integrally supporting discharge tube 48. Disposed between the inlet 46 and the discharge 48 is a multilayer body 52 for controlling the flow of fluid, preferably gas, and most preferably a noble gas, especially Xenon, from the inlet to the discharge. In FIG. 13, the multilayer body 52 is seen to comprise a sealing glass layer 60, an intermediate flow-control layer 62, and a supporting glass layer 64, and is secured within the housing 40. In the previously described embodiment shown in FIG. 1, the seal 12 connecting the body 8 with the housing 9 was an elastomeric material, which unfortunately inherently limits operating temperatures for the rheostat approximately to about 400° F. maximum. Further, outgassing of elastomeric materials is very difficult for a satellite environment as presently contemplated, in which a high purity gas is metered under high precision of mass-flow rate.

The glass layers 60, 64 are preferably of a composition having a coefficient of thermal expansion (COTE) approximating that of the intermediate flow-control layer 62, preferably silicon, in an operating-temperature regime of from about 0 (zero) to about 600° F. Various glass compositions having a suitable COTE are known, a preferred composition being grade-7740 glass available from Dow Corning (Ithaca, N.Y.). The glass 60, 64 can be bonded to the silicon intermediate layer 62 by various known techniques, a preferred method being anodic bonding (e.g., Wallis, supra). Generally, anodic bonding entails providing a hot surface (typically 400–550° C.) upon which the silicon layer is placed, and on top of which the glass layer is placed. A voltage of about 1 kV is applied across the two layers (silicon at the cathode, glass the anode), and the layers are pressed together under hermetic conditions to produce a silicon-glass laminate. As described previously with reference to FIG. 9, the silicon is made using microelectronic photoetching techniques, and is fabricated into a wafer form having multiple units thereon. The anodic bonding is preferably conducted prior to the wafer being cut into individual components. Thus, by this preferred process, when the chips are cut, they are in multiple, with each chip 52 already in a multilayer configuration.

The housing portions 42, 44 are preferably made of a low-carbon stainless steel, such as 304L grade. Unfortunately, glass having a good COTE match to silicon cannot be well-bonded to stainless steels. Thus, to facilitate bonding to the preferred stainless steel housing 40 used in the preferred embodiments of the invention, the multilayer body 52 can be bound first to a KOVAR metal composition (generally containing iron, nickel, and cobalt). The multilayer chip 52 has a supporting glass layer 64 by which the chip 52 is secured to the housing 40 at a back plate 66, also made of stainless steel (e.g., 304L). Between the stainless steel back plate 66 and the supporting glass layer 64 is a KOVAR foil layer 68, to which the glass can be bonded. Other suitable materials for the foil 68 include titanium, stainless steel, aluminum, and the like; for example, a titanium foil is useful if the housing 40 is made of titanium, thus enabling the foil to be welded to the housing. The thickness of foil 68 is in the range of from about 1.5 mil to about 3 mils, with even thicker foils being preferred, being more durable during the manufacturing and assembly of the device. In a preferred embodiment, the foil layer is spike welded (e.g., laser or electron beam) to the back plate 66, which in turn is secured to the housing 40 by a circular sealing ring 70 secured at weld 72 to the housing. The support glass layer 64 is secured to the foil layer 68 by known methods, (e.g., G. Wallis and D. I. Pomerantz, "Field Assisted Glass-Metal Sealing", *Applied Physics,* vol. 40, no. 10, 3946–3949 (September 1969); the disclosure of which is incorporated herein by reference).

The resulting structure provides a structurally isolated but bonded chip 52. In such a configuration, the chip 52 is isolated from mechanical and thermal stresses induced upon the housing by the foil. For example, if the housing is subjected to a changed ambient temperature (i.e., heated or cooled), the housing will change dimensions (expand or contract); if the chip is bonded directly to the housing, then mismatch between the coefficients of thermal expansion (COTE) between the chip and the housing may be too great and result in chip breakage. On the other hand, if the isolation and cushioning means of the first-described embodiment (e.g., an elastomeric or polymeric gasket, such as seal 12 in FIG. 1) is used to secure the chip 52, then outgassing of the organic material during start-up or at higher operating temperatures can cause significant problems in regulating the flow; outgassing can occur when volatiles are released from the organic/polymeric material as it is heated or as the local pressure is lowered. Most preferably, then, it is desired to eliminate the presence of all non-metallic, especially non-inorganic, components. Thus, the present invention provides a solid state flow control device 52 isolated from stress of the housing 40 in which it is protected. As such, it is also preferable to keep the back plate 66 as thin as possible to minimize thermal conduction from the housing 40 to the chip 52. In fact, another advantage of the sealing the chip 52 to a foil support layer 68 is that the seal formed between the chip and the foil is preferably a hermetic seal, thereby preventing bypass leakage, and requiring the gas flow to go through the chip mass-flow-control device.

With more detailed reference to FIGS. 14 and 15, respective bottom-end and cross-sectional views of the intermediate flow-control layer 62 are shown. The sealing glass layer 60 is bonded to the significantly photoetched surface of the flow-control layer 62. Etching is preferably done by techniques well-known in the semiconductor fabrication industry, and such etching typically occurs along one or more of the [111] planes of the silicon 62; single-crystal silicon is typically provided commercially as a wafer having a polished [100] surface. Although the various grooves and other etched parts in the drawings may not show the same angle, it will be understood that with the described etching of single-crystal silicon, all walls will typically slope at the complement of 35.26° from the horizontal because of the etching technique (e.g., using an anisotropic etchant such as KOH on the [100] plane).

"V"-shaped grooves are formed by allowing the etchant to penetrate fully, so that the co-etching walls meet at the bottom of the "V", whereas channels with a flat bottom surface denote areas where the etchant was stopped prematurely, before the etching walls met at the bottom of the channel.

The sealing glass layer 60 is seen in FIGS. 14 and 15 to span dual flow-control units with inlet ports 74, 74' which lead to inlet manifolds 80, 80' etched in the chip. The gas then passes through separate sets of comb filters 82, 82' into manifolding troughs 84, 84', and then into separate capillary flow-control groove 86, 86', for exit through a single exit port 88. The respective cross-sectional areas of the manifolds 80, 80', troughs 84, 84', capillaries (flow-control grooves) 86, 86', and filters 82, 82' are about 94.55, 78.79, 10.72, and $2.04 \times 10^{-6}$ in$^2$.

There is a multiplicity of comb filters 82, 82' so that a number of the filters can become plugged without significantly diminishing the combined cross-sectional area for the filters to near that of the other flow channels; thus, plugged filters will not significantly limit flow.

The edges of the flow-control layer have a flat electrode surface 90 upon which an electrically conducting metal layer 92 (e.g., gold) is deposited (as by sputtering) and connected to the electrical pins 50 by wire leads 94 (FIG. 13), preferably by ultrasonic ball bonding (a technique well-known in the microprocessor fabrication industry). When a current is passed across the intermediate flow-control layer 62, the layer heats up (consumes power) generally according to $i^2R$, wherein i is current flow; the resistance R of the silicon is about 3Ω at ambient temperature and about 10Ω at high temperature (about 600° F.), so that the electrical energy requirement is about 30 watts at about 16 volts applied voltage. According to the above-discussed equation, the mass-flow rate (m) decreases as the temperature of the device increases. Thus, the present invention controls the mass flow from an inherent maximum (based on the differential pressure) to a minimum based on the temperature the intermediate flow-control layer 62 imparts to the gas. The gas flow leaves from the exit 88 through an orifice 96 in the glass support layer 64 and an aligned orifice 98 in the back plate 91 and out through the discharge tube 48.

To maximize the heating effect, the interior surface which defines the inlet housing manifold 58 is preferably polished to reflect heating radiation (such as emanating from the silicon flow-control layer 62) back onto the flow-control layer, and the outer surfaces of the glass layers 60, 64 can be plated to further reflect radiation back onto the chip surface. Such reflective materials include aluminum, silver, and gold, and mixtures and alloys thereof. Energy-conservation measures are important in the environment of a satellite having a limited on-board electrical supply. Another important consideration is thermal management, as the present devices (as well as the thermothrottle of the prior art) generate heat and thus affect the local environment in which the devices are operated.

The multilayer body 52 is preferably attached to the housing 40, via the foil 68 and back plate 66, along only a portion of the side of support glass 64. As shown in more detail in FIG. 15, a central portion of the support glass layer 64 is etched in a circular shape to provide a circular land or boss 99, and it is this boss that is sealed to the foil layer 68. There is reduced contact between the glass 64 and the foil 68, because of joining only at the boss 99, thus inhibiting conductive heat loss from the multilayer body 52 to the housing 40. The boss 99 provides a sufficient base area, via which the chip 52 can be securely and hermetically bonded, thus providing mechanical isolation of the chip from the housing 40 and assuring that the fluid flow is conducted through the chip and does not leak around the chip's supporting structure.

Figure 16:
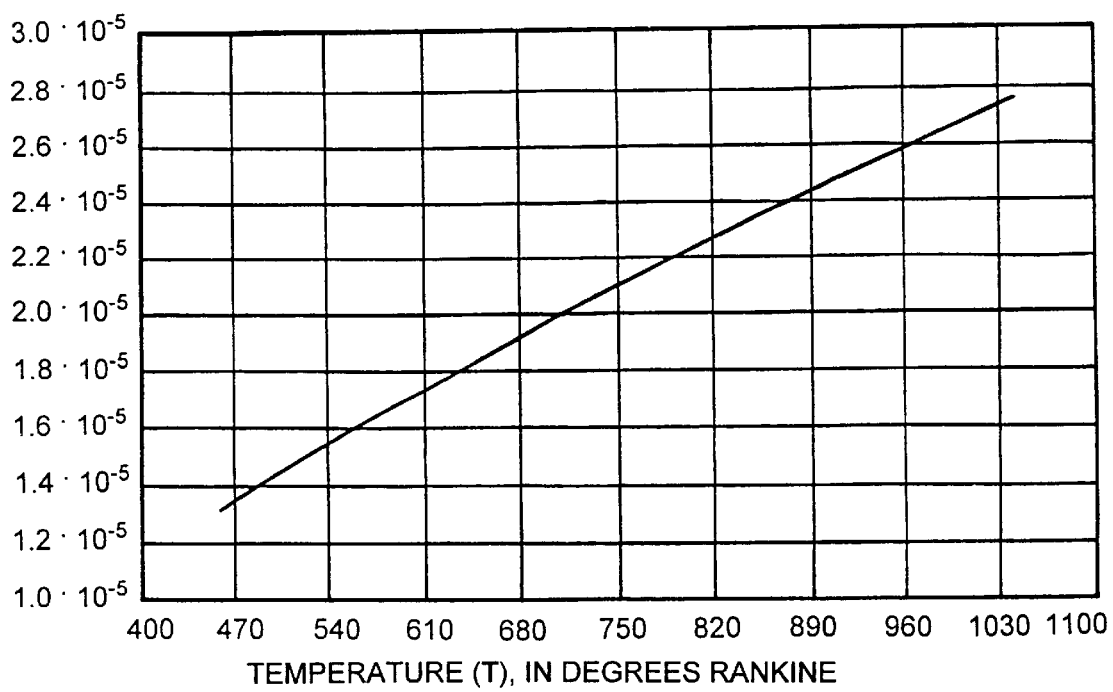
FIG. 16 is a graph of viscosity versus temperature.
Figure 17:
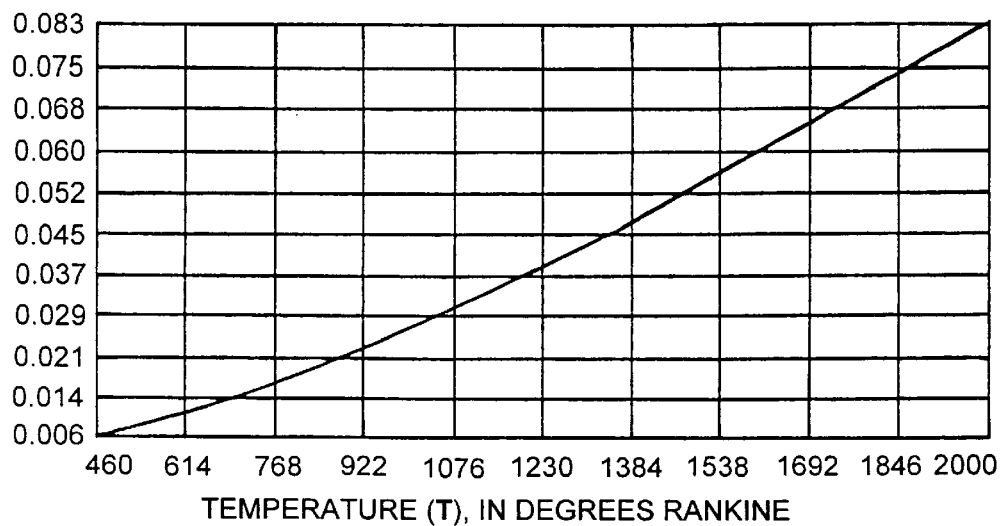
FIG. 17 is a graph of the product of viscosity and temperature, versus temperature, for Xenon, and within the operating temperature range of the present invention.

Control of the gas flow can be facilitated by knowing the relationship of viscosity and temperature. Accordingly, simulations were done to determine these relationships. Viscosity was calculated as a function of temperature using the equation $U = -1.3654543 \times 10^{-6} + 3.4895775 \times 10^{-8\circ} T - 6.7386464 \times 10^{-12\circ} T^2$; these results are shown in FIG. 16, a graph of viscosity (U) versus temperature (T) in degrees Rankine, and in FIG. 17, a graph of the product of $U^{.\circ}$ T. versus T.

Typical design parameters are shown in Table 1 below:

TABLE 1

| | | | |
|---|---|---|---|
| 25 μm | C1 | capillary width | 0.98 mil |
| 12.5 μm | F1 | filter width | 0.49 mil |
| 500 | Fn | number of filter openings | |
| 10 μm | F2 | filter spacing | 0.39 mil |
| 500 μm | F3 | filter length | 19.69 mil |
| 250 μm | F4 | filter collector (manifold) width | 9.84 mil |
| 80 μm | C2 | capillary spacing | 3.15 mil |
| 750 μm | C3 | capillary edge distance | 29.53 mil |
| 346,950 μm | C4 | capillary length | 13.66 in. |

The present device has a number of applications in environments where it is desirable to control the flow of a gas, and possibly of some liquids. Such environments include apparatus such as gas chromatographs and other analytical and medical instrumentation and control systems.

Figure 25:
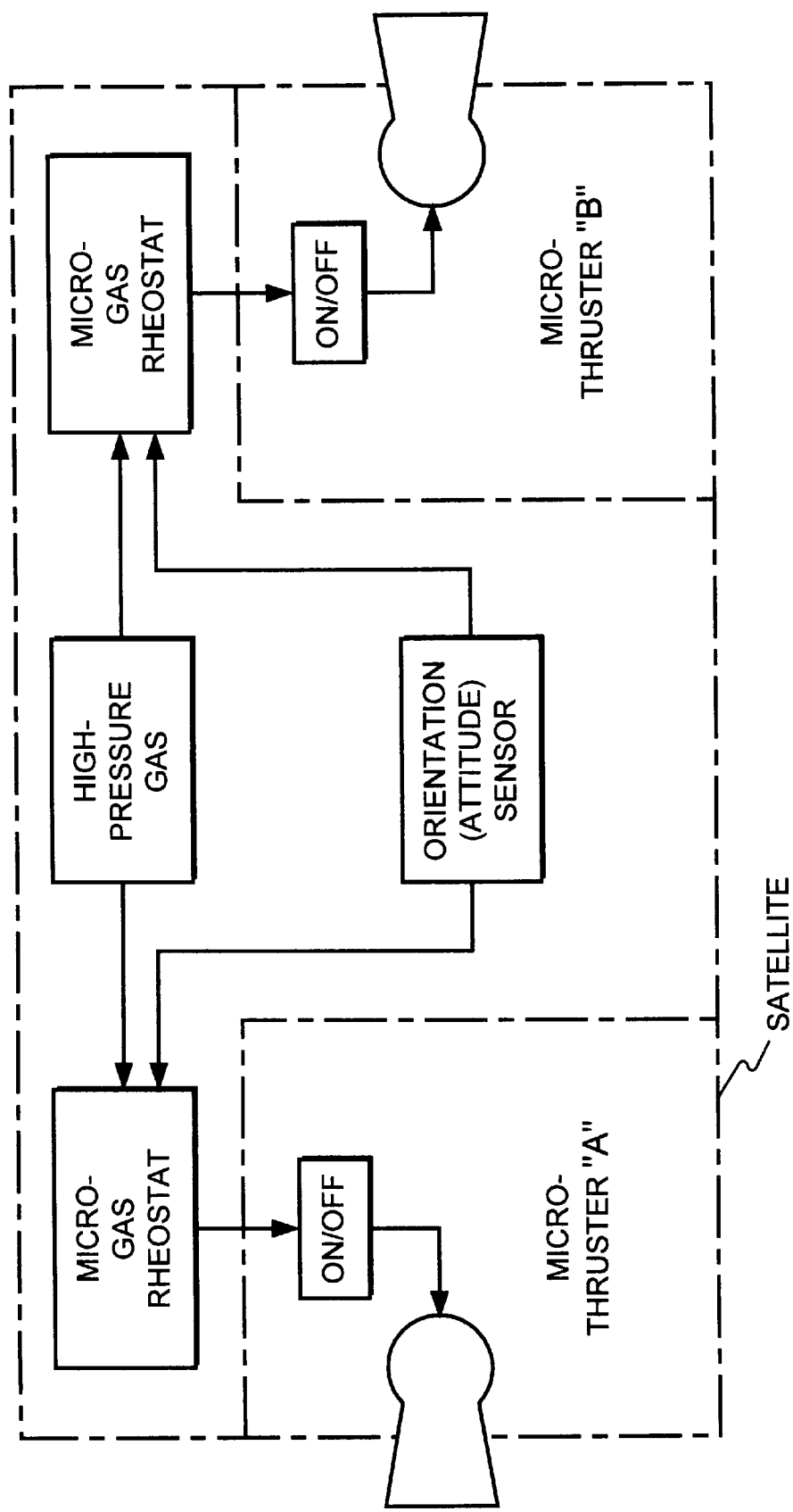
FIG. 25 is a schematic diagram of a satellite having provision for correcting its orientation by controlled gas expulsion from thrusters, wherein gas flow to the respective thrusters is in each case metered using a micro-gas rheostat of the invention.

As alluded to above with regard to said application Ser. No. 08/659,965 directed to microvalves and microthrusters, the present device is particularly useful for controlling the flow of thruster gas to a microthruster. Because the thrust force is a function of the amount of mass ejected and its velocity, the velocity being a function of the pressure drop and the presence of a nozzle, the thrust force and duration can also be controlled, at least in part, using the micro-gas rheostat of the present invention, as schematically indicated by legends in the diagram of FIG. 25, wherein microthrusters A, B are plainly shown for opposite directions of thrust-force reaction on the satellite. For example, the present device can throttle down the gas flow to the microthrusters A, B when smaller thruster bursts are required.

This invention can be an element of a closed-loop control system. For example, the thrust and the power to the thruster (such as microthruster A or B in FIG. 25) can be measured, and they can be effectively varied by throttling the gas mass supply flow down or up to alter the thrust and the power used by the thruster. Alternatively, the invention can be a closed-loop control system in and of itself, wherein the electrical resistance of the heater (such as metal layer 92 in FIG. 15) the chip (such as chip 52 in FIG. 15) is measured and, knowing or measuring the pressure drop across the rheostat, the mass-flow rate can be determined. As such, a temperature set point can be used indirectly as a mass-flow set point, and the output of a comparitor (comparing the actual temperature and the set point, or the inversion of the output signal) can be used to control the current sent to the heater or chip. For example, as the temperature equivalent to a desired mass-flow rate (determinable from a look-up table, and thus programmable onto a memory chip) falls below the set point, and the flow increases, the comparator output can be fed to the heater circuit, causing a temperature increase and thereby reducing the flow. Further, these control systems can be in the form of an integrated circuit also located within the housing (such as housing 40 in FIG. 12) or even etched onto a portion of the solid state rheostat (such as chip 52 in FIG. 13) itself.

Figure 18:
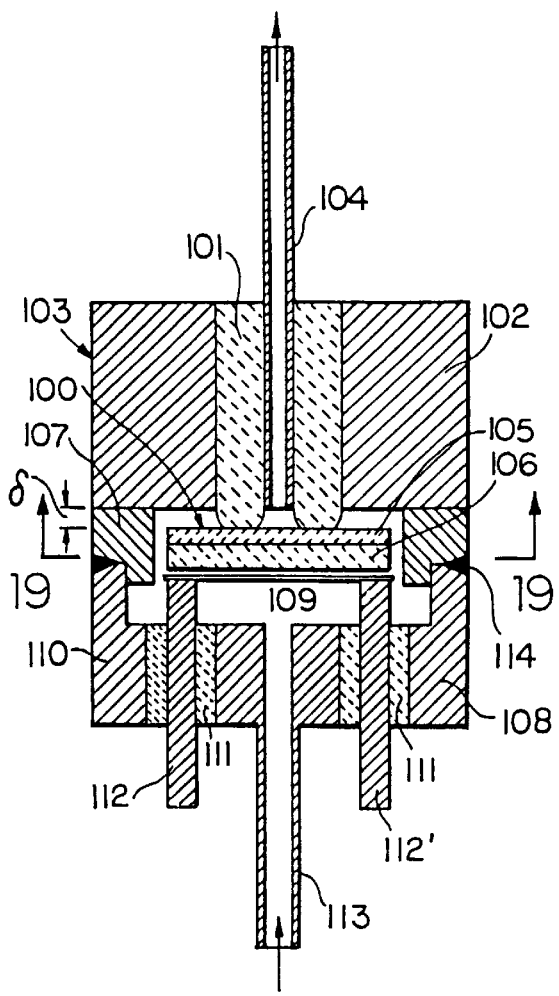
FIG. 18 is a simplified view in longitudinal section for another embodiment of the invention.
Figure 19:
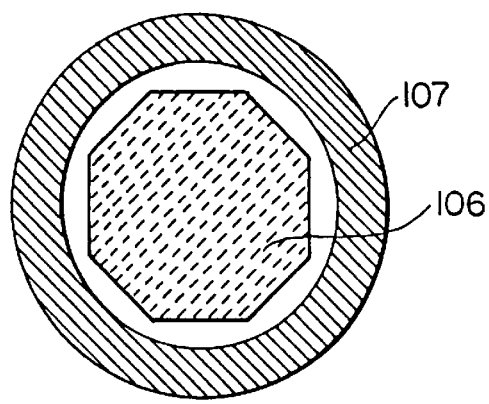
FIG. 19 is a section taken at 19—19 in FIG. 18.

The embodiment of FIGS. 18 and 19 is illustrative of a mechanical arrangement wherein a flow-control chip 100, which may be one of several varieties already described, is ruggedly and entirely supported by an annular insert 101 of glass (suitably a borosilicate glass) that is bonded with the central bore of an element 102 of an upper housing 103. The bore of insert 101 is bonded to the outlet tube 104, such that at the interior end of bonded elements 101, 102, 104, the end of insert 101 projects as an annulus downwardly away from elements 102, 104, thus enabling a polishing operation on this projecting end, the polishing operation being to assure a high quality flat annular end surface of element 101 to be assembled, preferably by an anodic bond, to the similarly flat upper surface of the silicon layer 105 of chip 100. The position and orientation of chip 100, and particularly the lower surface of its glass support layer 106, may thus be precisely controlled for a predetermined offset δ of chip 100 from a lower plane of reference to housing element 102, prior to assembling a shouldered ring 107 to element 102, to complete the upper housing 103. The ring 107 is suitably of stainless steel, inertia-welded to the Kovar of upper housing element 102.

Preference is indicated for the upper housing element 102 and for tube 104 to be of Kovar and for the glass insert 101 to be of Dow Corning 7740 glass, whereby such differences of thermal coefficients of expansion as exist at Kovar/glass interfaces will always favor at least a degree of distributed compressional loading, such as to preclude glass-to-Kovar bonding.

It is a further feature of the embodiment of FIGS. 18 and 19 that the lower housing 108 is a precision subassembly for mounting the electrical heater means 109 in uniform closely spaced offset from the lower surface of the support-glass layer 106 of chip 100. To this end, lower housing 108 is cup-shaped and suitably of stainless steel, providing a skirt 110 which is later nested to the shoulder of ring 107. The bottom of the cup-shape of lower housing 108 features diametrically opposite parallel bores for annular glass inserts 111 which mount the respective feed-throughs 112–112' for rugged support and precise positioning of heater means 109. The feed-throughs 112–112' are suitably of Kovar or stainless steel, and the glass of inserts 111, and their bonded relation to Kovar or stainless steel, may be as described for the insert 101. The lower housing 108 is illustratively completed by a central inlet port and tube formation 113, and lower-housing to upper-housing assembly 108, 103 is shown permanently completed by a peripherally continuous weld 114 of the nested relation.

The total reliance upon glass and/or silicon for direct and sole support of chip 100 will be seen as advantageous by reason of having avoided reliance upon any heat-sinking metal for direct support of or contact with chip 100, thus economizing on use of electrical energy for heater-element supply. An even greater advantage of this nature will be seen in the modification of FIG. 20, which is in all respects the same as described for FIG. 18, except that in FIG. 20, the longitudinal offset δ between chip 100 and the potentially heat-sinking mass of upper-housing element 102' is effectively greatly enlarged by relying on a frusto-conical formation 115 of that part of element 102' which provides bonded support of glass insert 101 near its plane of anodic bonding to chip 100.

The directional arrows, designating inlet supply-gas flow at 113 and outlet controlled-gas flow at 104, will be understood to apply for a chip configuration at 100 wherein etched comb-filter grooves (not shown) perform their filtering action upstream from the etched area of flow-control grooves (also not shown in FIG. 18), e.g., akin to the FIG. 3 configuration wherein comb-filter action surrounds the inner region of flow control, with outlet flow that is central of the chip and with discharging controlled flow to and through the outlet tube 104. On the other hand, it will be further understood that, for an opposite direction of flow, wherein tube 104 is the inlet and tube 113 is the outlet, it is desirable that comb-filter etching be provided upstream from the flow-control grooves, i.e., between the central inlet opening and the point of gas-flow supply to the region of flow-control groove system, and with the flow-control groove system discharging via tube 113.

Figure 20:
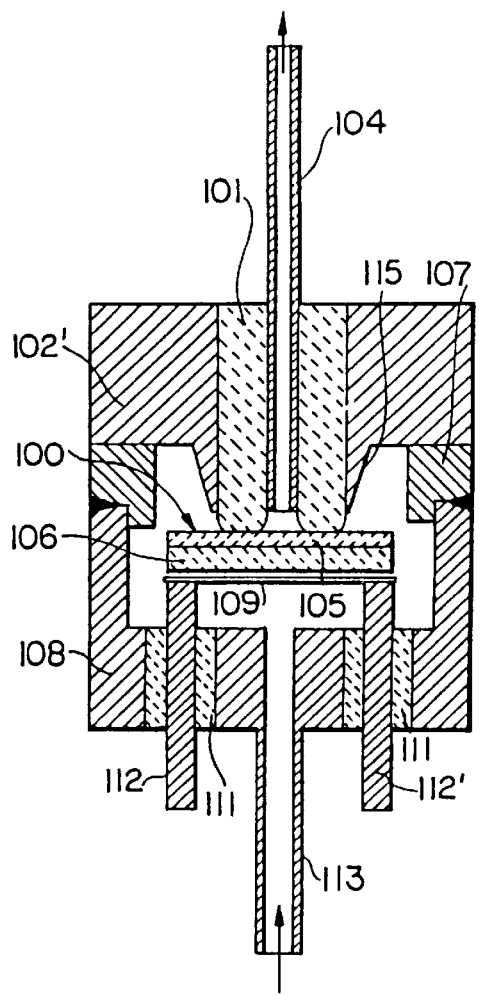
FIG. 20 is a view similar to FIG. 18, to show a modification.
Figure 21:
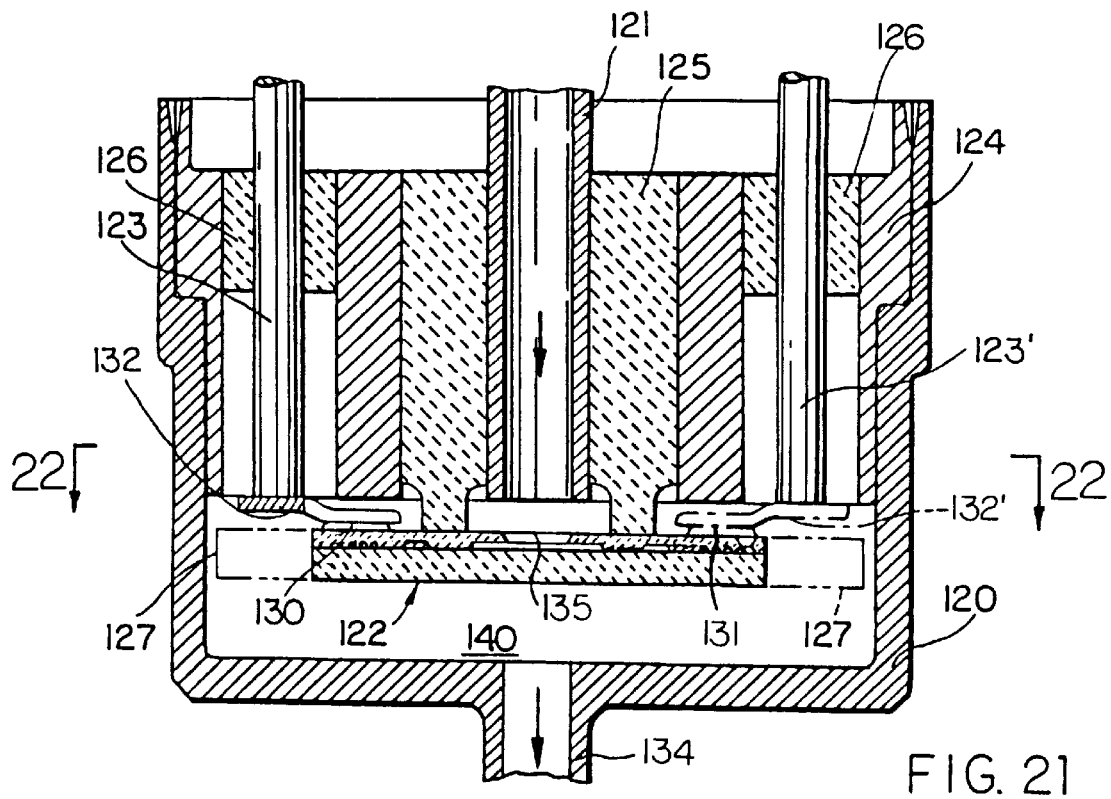
FIG. 21 is an enlarged view in longitudinal section for a further embodiment of the invention.
Figure 22:
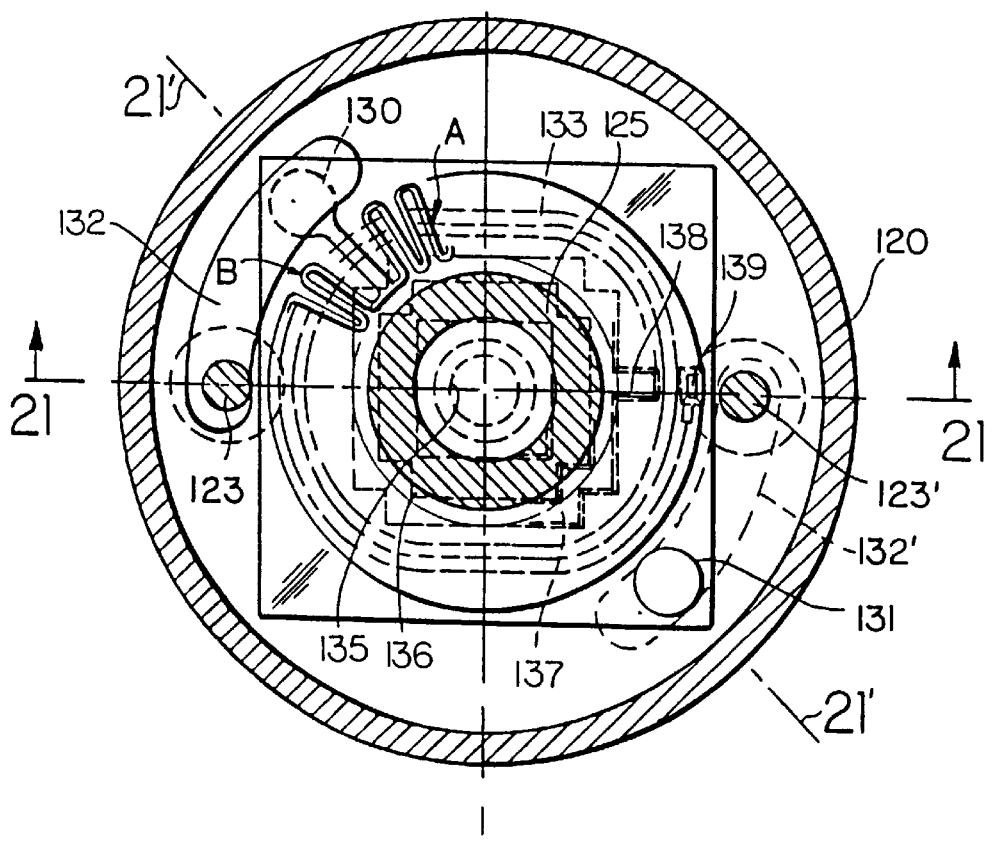
FIG. 22 is a schematic section, taken generally at 22—22 of FIG. 21.

The embodiment of FIGS. 21 and 22 is illustrative of a variation of the embodiment of FIGS. 18 to 20, wherein a single cup-shaped housing member 120 has a skirt portion characterized by a counterbore into which a preassembly of an operative flow-control chip 122, with electrical connections 123, 123', is integrated into a single housing closure component 124 which is externally configured for precise and stabilized seating engagement within the bore and counterbore features of housing member 120. A large central bore in closure component 124 has bonded cylindrical interface with an annular glass (dielectric) insert 125 (corresponding to the configuration and function of insert 101 in FIGS. 18 to 20; similarly, a central inflow tube 121 has bonded cylindrical interface with the bore of insert 125, and the polished lower projecting annular end face of insert 125 has an anodized bond to the upper flow-control layer of chip 122, thereby providing essentially the sole means of chip support with respect to the housing 120.

In departure from the structure of FIGS. 18 and 19, the electrical feed-through elements 123, 123' of FIGS. 21 and 22 are integrated into the single subassembly carried by and within the cylindrical outer surface of housing-closure member 124, these electrical elements 123, 123' being mounted by annular glass (dielectric) inserts 126, to diametrically opposite bores in closure member 124, in the manner described at 111 in connection with FIGS. 18 and 19.

The gas-rheostat chip 122 is shown to be square, with side-to-side spacing that is evident from the sectioned area of the chip, as seen in FIG. 21, the diagonal extent of the chip being suggested in FIG. 21 by phantom extensions 127, as will be seen in FIG. 22 to apply on the diagonal alignment 21'—21' of FIG. 22, which illustratively shows the radially undulating course of two-like heater elements A, B having opposite semicircular courses, in parallel, between diametrically opposite metal terminals or contacts 130, 131 on the upper surface of chip 122 and at diagonally opposed corners of the square (on alignment 21—21), for the sake of clarity in FIG. 22, only terminal 130 has been shown connected to corresponding first ends of heater elements A, B, and it will be understood that similar connections are made for the other ends of heater elements A, B, to the other terminal 131. The lower end of each of the feed-through elements 123, 123' is shown carrying a compliantly cantilevered arcuate contact-wiping arm 132, 132', in resiliently loaded contact with the metal terminals 130, 131 on the upper flat surface of chip 122.

Further in connection with FIGS. 21 and 22, a sealed flow-control groove 133 of expanding-helix nature is shown, by phantom suggestion, to be in register with the heater elements A, B, and thus with the peripherally continuous outer annular region of chip 122.

Directional arrows in inlet tube 121 of the housing-closure component 124, and in outlet tube 134 of the cupped housing element 120, illustrate the single direction of inlet flow to and of rheostat-controlled outlet flow from the housing. The inlet flow has direct and exclusive access to a central port 135 of chip 122 which has manifolded radially outward gas entry into a four-leg comb-filter region 136, it being noted that the four legs of the comb filter are largely lapped by the cross-hatched annular region of bonded support of chip 122 by the annular member 125 of dielectric material (glass). In turn, the collective flow after comb-filtration is accommodated in a surrounding manifold formation 137, having inlet-flow access at 138 to the expanding-helix path 133 of rheostat flow-control, ending with a single outlet port 139 of the chip 122, with discharge access into the internal open volume 140 of the housing and, therefore, with downstream discharge via housing port 134.

Figure 23:
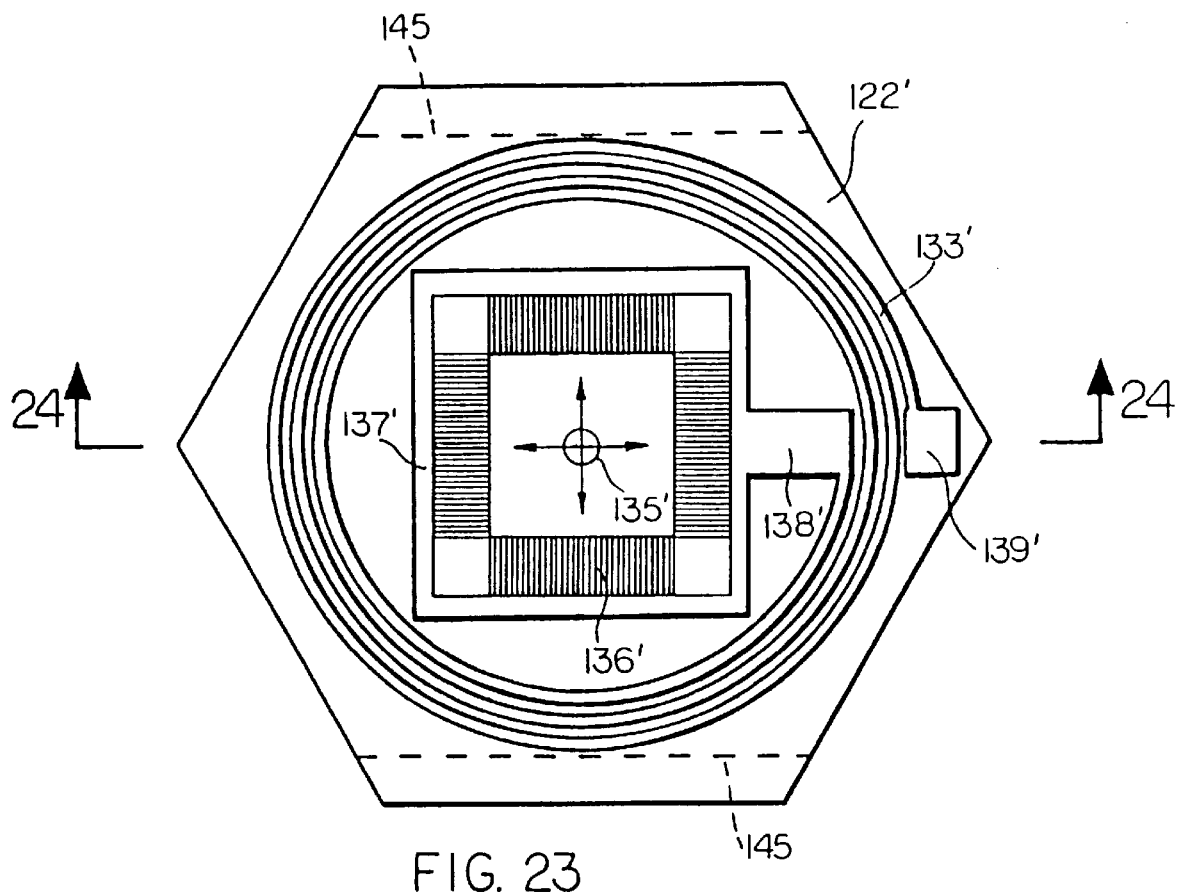
FIG. 23 is a simplified plan view of another embodiment.
Figure 24:
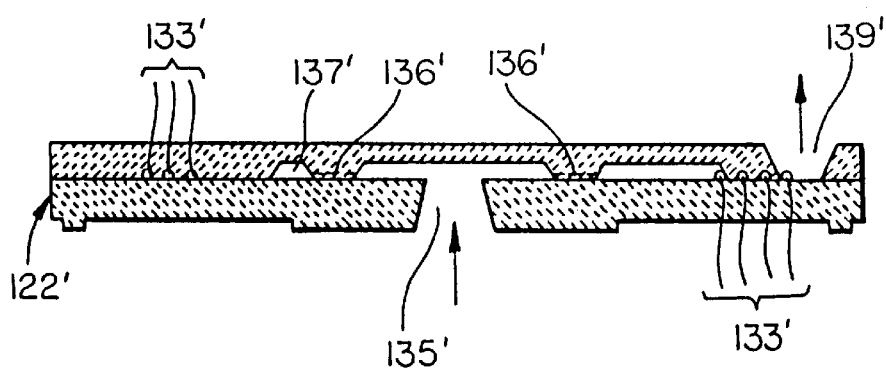
FIG. 24 is a section taken at 24—24 of FIG. 23.

The embodiment of FIGS. 23 and 24 illustrates that the gas rheostat 122', as at 122 of FIGS. 21 and 22, may be built with a hexagonal planform, which may be preferable for certain housing and electric-terminal purposes (other than those of FIGS. 21 and 22). Corresponding parts of the flow accommodation in FIGS. 23 and 24 are therefore shown with the same reference-number identifications, as described for FIGS. 21 and 22, but with primed notation. Thus, inlet flow via central opening 135' is shown as having manifolded access, in the radially outward direction, to the four legs of comb-filter means 136'; and the comb filters discharge via manifolding means 137' and passage 138' to the inlet end of the expanding helix course of the flow-control passage 133'. The other end of the flow-control passage will be understood to open at 139' into the interior volume of the closed housing (not shown in FIGS. 23 and 24), for exit flow from the involved housing. In the drawing of FIG. 23, dashed lines 145 along opposite sides of the hexagonal planform of the chip 122', will be understood to suggest another technique of chip mounting to suitable ledge or shoulder means which constitutes a supporting feature of the internal profile of one of the housing elements.

The foregoing description is meant to be illustrative of the invention and not limiting. Various changes, modifications, and additions may become apparent to the skilled artisan upon a perusal of this specification, and such are meant to be within the scope and spirit of the invention as defined by the claims.

What is claimed is:

1. A gas rheostat, comprising:
   A. first and second separate housing elements adapted when fitted together to define a closed internal volume about a common central axis, one of said housing elements having port means for external gas-inlet tube connection on said axis, and the other of said housing elements having port means for external gas-outlet tube connection on said axis;
   B. a multilayer rheostat body supported by and within said housing, said rheostat body comprising a flow-control layer having two spaced flat surfaces defining the thickness of said flow-control layer, with a gas-flow channel provided in one of said surfaces, and a sealing layer having a flat surface bonded to said one surface, one end of said channel having a single central port of gas-flow accommodation via the center of said rheostat body to one of said means for tube connection on said axis, and the other end of said channel having gas-flow accommodation via said internal volume to the other of said means for tube connection on said axis; and
   C. a controllable heater supported by and within said housing for heating said rheostat body.

2. A gas rheostat according to claim 1, in which said rheostat body is totally carried by one of said housing elements, and said heater is totally carried by the other of said housing elements.

3. A gas rheostat according to claim 1, in which said rheostat body and said heater are both carried by one of said housing elements.

4. A gas rheostat according to claim 1, in which filter means is carried by said one housing element in interposed relation between (a) said means for external gas-inlet tube connection and (b) one end of said channel, the other end of said channel being connected to said means for external gas-outlet tube connection.

5. A gas rheostat according to claim 4, in which said filter means is symmetrically arrayed about said axis.

6. A gas rheostat according to claim 4, in which said filter means is a square configuration of four like comb-filter legs in symmetrical array about said axis.

7. A gas rheostat, comprising:
   A. first and second separate housing elements of metal and adapted when fitted together to define a closed internal volume about a common central axis, one of said housing elements being a closure-member having port means for gas connection on said axis, and the other of said housing elements being a cup having a gas-connection port and an internal shoulder adapted to receive a volume-closing fit by said closure member;
   B. a multilayer rheostat body having two spaced flat surfaces defining the thickness of said flow-control layer, with a gas-flow channel provided in one of said surfaces, and with a sealing layer having a flat surface bonded to said one surface, one end of said channel having a single central port of gas-flow accommodation via the center of said rheostat body to the port means of said closure member, and the other end of said channel having gas-flow accommodation via said internal volume to the other of said gas-connection ports;
   C. said closure member having a cylindrically annular body of dielectric material having a bore defining the port of said one housing element and bonded to a central bore which extends between an upper externally exposed surface of said closure member and a lower internally exposed surface of said closure member, said annular body having a lower annular end which projects axially beyond the lower internally exposed surface of said closure member, the lower projecting annular end of said cylindrical body being bonded to and providing sole support of said rheostat body, with the bore of said annular body in communication with the single central port of gas-flow accommodation via the center of said rheostat body; and
   D. a controllable heater supported by and within said housing for heating said rheostat body.

8. A gas rheostat according to claim 7, in which said heater is a component element of said rheostat body.

9. A gas rheostat according to claim 8, in which said heater element is a component element of said rheostat body and substantially defined within said annular region.

10. A gas rheostat according to claim 8, in which spaced electrically conductive feed-through elements with flexible internal connection to said heater are individually supported within separate bodies of dielectric material bonded to and within two spaced further bores of said one housing element.

11. A gas rheostat according to claim 7, in which said rheostat body is peripherally continuous in an annular region that is radially outward of said cylindrical body, said channel being substantially defined within said annular region.

12. A gas rheostat according to claim 11, in which said channel is an expanding helical development within said annular region.

13. A gas rheostat according to claim 7, in which filter means is a component of said rheostat body, said filter means being interposed between (a) said one end of said channel and (b) said single central port.

14. A micro-chip assembly, comprising:
   A. first and second separate housing elements of metal and adapted when fitted together to define a closed internal volume about a common central axis, one of said elements having a bore centered on said axis, and a cylindrical member of dielectric material having bonded fit to said bore such that said cylindrical member presents an inner axial end which projects into said internal volume to establish a projecting flat inner-end surface normal to said axis and at axial offset from the metal of said one housing member;

B. a solid-state microchip element including an electrical-circuit component and having a flat surface bonded to said flat inner-end surface and mechanically supported by said cylindrical member of dielectric material; and C. electrical lead-through elements having insulated passage through one of said housing elements, and with flexible conductor connection to the electrical-circuit component of said solid-state element.

15. The microchip assembly of claim 14, in which said microchip element is an electrically controllable microgas rheostat.

16. A gas rheostat, comprising:

A. a multilayer rheostat body comprising a flow-control layer having provided in one surface thereof (i) a gas-flow channel essentially parallel to the surface and (ii) a plurality of comb-filter channels essentially parallel to said surface and connected in parallel to said gas-flow control channel, said channels being defined by said flow-control layer and by a sealing layer bonded to said surface, said rheostat body having provision for inlet flow to said comb-filter channels and for a flow-discharge outlet from said gas-flow control channel;

B. a housing having separated fluid paths for conducting gas to the flow inlet of the rheostat body and for conducting gas from the flow-discharge outlet, and the housing having means for securably supporting the rheostat body within the housing; and C. a controllable heater for heating the rheostat body.

17. The gas rheostat of claim 16, wherein said flow-control layer of the rheostat body comprises a single-crystal material selected from the group consisting of silicon, gallium arsenide, silicon nitride, boron nitride, and silicon carbide.

18. The gas rheostat of claim 16, wherein the flow-control layer comprises a photoetchable material.

19. The gas rheostat of claim 16, wherein the gas flow path in the surface of the flow-control layer is defined by an inlet manifold, filters, a feeder trough, and the gas-flow channel.

20. The gas rheostat of claim 19, wherein the gas-flow path is one of two gas-flow paths in the same flow-control layer.

21. The gas rheostat of claim 16, wherein the flow-control channel and the comb-filter channels are formed by photo-etching.

22. The gas rheostat of claim 19, wherein the rheostat body further comprises a supporting glass layer bonded thereto.

23. The gas rheostat of claim 20, wherein said flow discharge outlet is located between and serves both of said gas-flow paths.

24. The gas rheostat of claim 23, further comprising a layer of metal foil secured within the housing and to which the rheostat body is bonded.

25. A gas rheostat, comprising:

A. a multilayer rheostat body comprising a flow-control layer having provided in one surface thereof a gas-flow channel essentially parallel to the surface, said channel being defined by said flow-control layer and a sealing layer bonded to said surface, said rheostat body having a flow-inlet to said channel and a flow-discharge outlet from said channel;

B. a housing containing and securably supporting said rheostat body, said housing having separate fluid paths for conducting gas to the flow inlet of the rheostat body and for conducting gas from the flow-discharge outlet of the rheostat body; said housing defining an inlet housing manifold having a polished surface.

26. The gas rheostat of claim 16, wherein said heater comprises an electric-heater element having two metallized terminal portions disposed on a surface of said flow-control layer, said heater element being disposed and effective to cause heating of substantially the entire flow-control layer when a voltage is applied across the two metallized terminal portions.

27. In a satellite having means for correcting its orientation by controlled gas expulsion from thrusters, wherein the improvement comprises metering a gas flow to a thruster using the gas rheostat defined by claim 16.

28. A method for controlling the flow of a gas, comprising:

A. providing a multilayer flow control body comprising a flow control layer having
 i. gas flow channels defined by channels in said flow control layer and sealed by a sealing layer,
 ii. an inlet to said flow channels, and
 iii. a discharge outlet from said flow channels;

B. provising across said body a pressure differential of the gas for which flow is desired to be controlled; and C. heating said flow-control layer to decrease the flow of gas through said gas flow channels, whereby the product of absolute viscosity of the gas times absolute temperature is operative to reduce gas flow.

29. The method of claim 28, wherein said heating step is operative over the extent of one of the faces of said flow-control layer.

30. A device for throttling control of a gas flow, comprising:

A. a housing providing a flow inlet and a flow outlet and an interior space;

B. a solid-state rheostat disposed in the interior space and comprising a micromachined gas-flow path providing fluid communication between the inlet and outlet, said solid-state rheostat further comprising micromachined filters between said inlet and the micromachined gas-flow path; and C. means for heating the gas-flow path in the solid-state rheostat.

31. The device of claim 30, wherein the solid-state rheostat is multilayer body comprising a microgrooved layer and a sealing layer bonded thereto.

32. A support structure for a micromachinable body, comprising: a housing having an interior portion defined by the housing; a metallic foil substrate supported within the housing and spanning a portion of the interior portion; and a micromachinable body bonded to the foil.

33. The support structure of claim 32, further comprising a backing plate supported within and spanning a portion of the interior portion and disposed parallel to said foil substrate.

34. A solid-state gas-mass-flow throttling device, comprising: a planform body having micromachined in a surface thereof a gas flow channel and a plurality of comb-filter channels connected in parallel to said gas flow channel; a sealing layer bonded to said surface effective to cover the gas flow channel; and means for heating the gas flow channel.

35. The device of claim 34, further comprising a support layer bonded to an opposite surface of said planform body from said sealing layer effective to form a multilayer sandwich with the planform body in the middle thereof.

36. A solid-state gas mass-flow throttling device, comprising: a planform body having micromachined in a surface thereof a gas-flow channel; a sealing layer bonded to said surface effective to cover the channel opening; means for heating the gas-flow channel; and a support layer bonded to an opposite surface of said planform body from said sealing layer effective to form a multilayer sandwich with the planform body in the middle thereof; the sealing layer and the support layer being coated with a metal effective to reflect thermal radiation emanating from the middle planform layer back on to itself.

37. The device of claim 34, wherein the means for heating includes electrically resistive metal strips bonded to said planform body on opposite sides thereof.

38. The gas rheostat of claim 16, wherein said sealing layer is comprised of glass.

39. The gas rheostat of claim 16, wherein said flow-control channel defines a single path between said comb-filter channels and the flow discharge outlet.

40. The gas rheostat of claim 16, wherein said flow-control channel is one of a plurality of flow-control channels communicating in parallel between said comb-filter channels and the flow-discharge outlet.

41. A gas rheostat, comprising:
   A. a multilayer rheostat body comprising a flow-control layer of etchable material having in one surface etched gas-flow channels essentially parallel to said surface, said channels being defined by said flow-control layer and a sealing layer bonded to said surface, said rheostat body having a flow inlet to said channels and a flow-discharge outlet from said channels, one of said channels defining a gas-flow channel and other of said channels defining a plurality of comb-filter channels connected in parallel to said gas-flow channel such that gas flow exiting said flow inlet enters said comb-filter channels and gas flow exiting said gas-flow channel enters said flow-discharge outlet;
   B. a housing having separate inlet and outlet fluid paths for conducting gas to the flow inlet of the rheostat body and for conducting gas from the discharge outlet, and the housing having means for securably supporting the rheostat body within the housing; and
   C. a controllable heater for heating the rheostat body.

42. The gas rheostat of claim 41, in which the gas-flow channels comprise first elongate flow-controlling channel means of substantially uniform first-channel cross-sectional area, and second filtering-channel means of substantially uniform second-channel cross-sectional area that is less than said first-channel cross-sectional area; said second filtering-channel means comprising a plurality of relatively short filter channels of said second-channel cross-sectional area; each of said filter channels being adapted to receive inlet communication from the inlet fluid path of said housing; a manifolding channel interposed between said filter channels and said flow-controlling channel, with said filter channels communicating with said manifold to discharge filtered inlet gas into said manifolding channel, and with said manifolding channel communicating with said flow-controlling channel means to supply filtered inlet gas into said flow-controlling channel means, and said flow-controlling channel means having an outlet adapted to exclusively communicate controlled gas flow to the outlet fluid path of said housing.

43. The gas rheostat of claim 42, in which the combined cross-sectional areas of said filter channels exceeds said first-channel cross-sectional area.

44. The gas rheostat of claim 43, in which said manifolding channel is an etched formation of said one rheostat-body surface, and in which the effective cross-sectional area of said manifolding channel exceeds the combined cross-sectional areas of said filter channels.

45. A gas rheostat for control of a flow of gas between inlet and outlet connections of a housing, said rheostat comprising:
   A. a multilayer rheostat body having in one surface thereof a grooved elongate gas-flow control channel extending between inlet and outlet formations thereof and having a first area of substantially constant groove cross-section, said rheostat body also having in said one surface a plurality of comb-filter grooves wherein the comb-filter grooves are individually of lesser cross-sectional area than said first area but are nevertheless collectively of greater cross-sectional area than said first area, and a sealing layer bonded to said one surface; said comb-filter grooves having inlet ends adapted to receive gas flow from the inlet connection of said housing and having manifolded outlet connection to the inlet formation of said gas-flow control channel, and the outlet formation of said gas-flow control channel having exclusive communication with the outlet connection of said housing; and
   B. controllable electric heating means contained within said housing for controlling gas flow through said gas rheostat as an inverse function of heat imparted to said rheostat body.

46. The gas rheostat of claim 45, in which the material of the rheostat body is single-crystal silicon.

47. The gas rheostat of claim 46, in which the gas-flow control channel is an etched groove to a first predetermined depth and in which said comb-filter grooves are etched to a depth less than said predetermined depth.

* * * * *